(12) United States Patent
Hall

(10) Patent No.: US 11,294,823 B2
(45) Date of Patent: Apr. 5, 2022

(54) SYSTEMS AND METHODS FOR REPLACING DATA RETRIEVED FROM MEMORY

(71) Applicant: SEMICONDUCTOR COMPONENTS INDUSTRIES, LLC, Phoenix, AZ (US)

(72) Inventor: Peter Michael Hall, Fetcham (GB)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 5 days.

(21) Appl. No.: 16/444,729

(22) Filed: Jun. 18, 2019

(65) Prior Publication Data

US 2020/0233811 A1 Jul. 23, 2020

Related U.S. Application Data

(60) Provisional application No. 62/794,299, filed on Jan. 18, 2019.

(51) Int. Cl.
*G06F 12/10* (2016.01)
*G06F 8/65* (2018.01)
*G06T 1/60* (2006.01)

(52) U.S. Cl.
CPC ............. *G06F 12/10* (2013.01); *G06F 8/65* (2013.01); *G06T 1/60* (2013.01); *G06F 2212/172* (2013.01); *G06F 2212/657* (2013.01)

(58) Field of Classification Search
CPC ...... G06F 12/10; G06F 8/65; G06F 2212/172; G06F 2212/657; G06T 1/60
See application file for complete search history.

(56) References Cited

U.S. PATENT DOCUMENTS

| 5,813,043 A * | 9/1998 | Iles ......................... G06F 9/328 |
| | | 711/102 |
| 2002/0124161 A1* | 9/2002 | Moyer .................. G06F 9/3017 |
| | | 712/234 |
| 2003/0051119 A1* | 3/2003 | Li ............................. G06F 8/66 |
| | | 711/210 |
| 2004/0210720 A1 | 10/2004 | Wong et al. |
| 2005/0030796 A1 | 2/2005 | Saado |
| 2005/0102550 A1 | 5/2005 | Goodnow |
| 2006/0107104 A1 | 5/2006 | Alexandre et al. |
| 2010/0107149 A1* | 4/2010 | Hsu ......................... G06F 9/328 |
| | | 717/168 |
| 2014/0149643 A1 | 5/2014 | Devinoy et al. |

(Continued)

*Primary Examiner* — Tuan V Thai
(74) *Attorney, Agent, or Firm* — Treyz Law Group, P.C.; Tianyi He

(57) ABSTRACT

An electronic system such as an imaging system may include processing circuitry and memory circuitry. Data replacement circuitry may be interposed between the processing circuitry and the memory circuitry. In some implementations, the memory circuitry may be a read-only memory, and data replacement circuitry may be used to selectively replace executable firmware instructions stored on the read-only memory. The selective replacement operations may be based on an address that processing circuitry provides to access the memory circuitry. The data replacement circuitry may be implemented separately from the processing circuitry and the memory circuitry and may include a comparator block, registers, and switching circuitry.

20 Claims, 6 Drawing Sheets

(56) References Cited

U.S. PATENT DOCUMENTS

| | | | |
|---|---|---|---|
| 2014/0289455 A1* | 9/2014 | Verhallen | G06F 12/0246 711/103 |
| 2017/0039056 A1* | 2/2017 | Ninos | G06F 3/0653 |

* cited by examiner

SYSTEMS AND METHODS FOR REPLACING DATA RETRIEVED FROM MEMORY

This application claims the benefit of U.S. Provisional Application No. 62/794,299, filed Jan. 18, 2019.

BACKGROUND

This relates generally to memory circuitry in electronic systems, and more specifically, to circuitry for patching data stored within the memory circuitry.

Modern electronic devices such as cellular telephones, cameras, and computers may use electronic systems such as imaging systems. These systems can include hardware that is controlled using software instructions such as firmware. Firmware instructions are often stored on a read-only memory by a manufacturer and are consequently not easily modifiable thereafter. As such, errors in the firmware instructions cannot be easily corrected.

While systems may allow for patching to correct firmware errors, these systems often require dedicated and resource-intensive circuitry or require changes to the processing circuitry involved in processing the firmware instructions, which is undesirable.

It would therefore be desirable to provide systems with improved data replacement capabilities especially when patching firmware instructions stored in a read-only memory.

DETAILED DESCRIPTION

Embodiments of the present invention relate to data replacement circuitry interfaced between memory circuitry and processing circuitry. It will be recognized by one skilled in the art that the present exemplary embodiments may be practiced without some or all of these specific details. In other instances, well-known operations have not been described in detail in order not to unnecessarily obscure the present embodiments.

The data replacement circuitry described herein may be generally implemented to interface with various types of memory circuitry in a number of hardware systems. As examples, the data replacement circuitry described herein may be implemented in as part of any electronic device (interfaced between memory circuitry and processing circuitry of any electronic device) such as a portable electronic device, a camera, a tablet computer, a desktop computers, a webcam, a cellular telephone, a video camera, a video surveillance system, an automotive imaging system, a video gaming system, or any other electronic device that may include or exclude imaging capabilities. Data replacement circuitry being formed as part of an imaging system or an electronic system is described in detail herein as examples. However, this is merely illustrative. If desired, the data replacement circuitry may be implemented in any of the above-mentioned systems or other systems.

Figure 1:
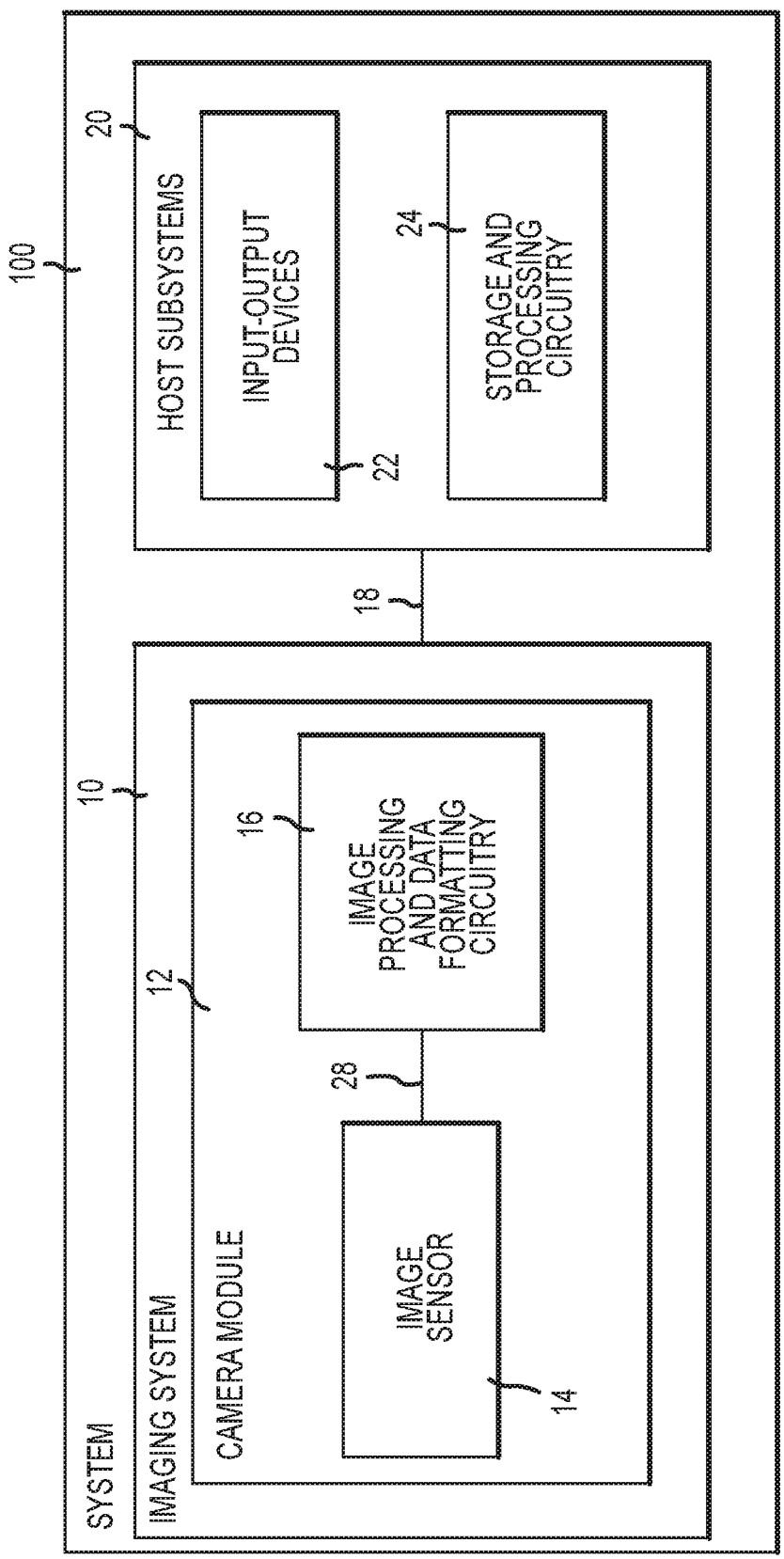
FIG. 1 is a diagram of an illustrative electronic device having an imaging system in accordance with some embodiments.

FIG. 1 is a diagram of an illustrative imaging and response system including an imaging system that uses an image sensor to capture images. System 100 of FIG. 1 may be an electronic device such as a camera, a cellular telephone, a video camera, or other electronic device that captures digital image data, may be a vehicle safety system (e.g., an active braking system or other vehicle safety system), or may be a surveillance system.

As shown in FIG. 1, system 100 may include an imaging system such as imaging system 10 and host subsystems such as host subsystem 20. Imaging system 10 may include camera module 12. Camera module 12 may include one or more image sensors 14 and one or more lenses.

Each image sensor in camera module 12 may be identical or there may be different types of image sensors in a given image sensor array integrated circuit. During image capture operations, each lens may focus light onto an associated image sensor 14 (such as the image sensor of FIG. 2). Image sensor 14 may include photosensitive elements (i.e., pixels) that convert the light into digital data. Image sensors may have any number of pixels (e.g., hundreds, thousands, millions, or more). A typical image sensor may, for example, have millions of pixels (e.g., megapixels). As examples, image sensor 14 may include bias circuitry (e.g., source follower load circuits), sample and hold circuitry, correlated double sampling (CDS) circuitry, amplifier circuitry, analog-to-digital converter circuitry, data output circuitry, memory (e.g., buffer circuitry), address circuitry, etc.

Still and video image data from camera sensor 14 may be provided to image processing and data formatting circuitry 16 via path 28. Image processing and data formatting circuitry 16 may be used to perform image processing functions such as data formatting, adjusting white balance and exposure, implementing video image stabilization, face detection, etc. Image processing and data formatting circuitry 16 may also be used to compress raw camera image files if desired (e.g., to Joint Photographic Experts Group or JPEG format). In a typical arrangement, which is sometimes referred to as a system on chip (SOC) arrangement, camera sensor 14 and image processing and data formatting circuitry 16 are implemented on a common semiconductor substrate (e.g., a common silicon image sensor integrated circuit die). If desired, camera sensor 14 and image processing circuitry 16 may be formed on separate semiconductor substrates. For example, camera sensor 14 and image processing circuitry 16 may be formed on separate substrates that have been stacked.

Imaging system 10 (e.g., image processing and data formatting circuitry 16) may convey acquired image data to host subsystem 20 over path 18. Host subsystem 20 may include processing software instructions for detecting objects in images, detecting motion of objects between image frames, determining distances to objects in images, filtering or otherwise processing images provided by imaging system 10.

If desired, system 100 may provide a user with numerous high-level functions. In a computer or advanced cellular telephone, for example, a user may be provided with the ability to run user applications. To implement these functions, host subsystem 20 of system 100 may have input-output devices 22 such as keypads, input-output ports, joysticks, and displays and storage and processing circuitry 24. Storage and processing circuitry 24 may include volatile and nonvolatile memory (e.g., random-access memory, flash memory, hard drives, solid-state drives, etc.). Storage and processing circuitry 24 may also include microprocessors, microcontrollers, digital signal processors, application specific integrated circuits, etc.

Figure 2:
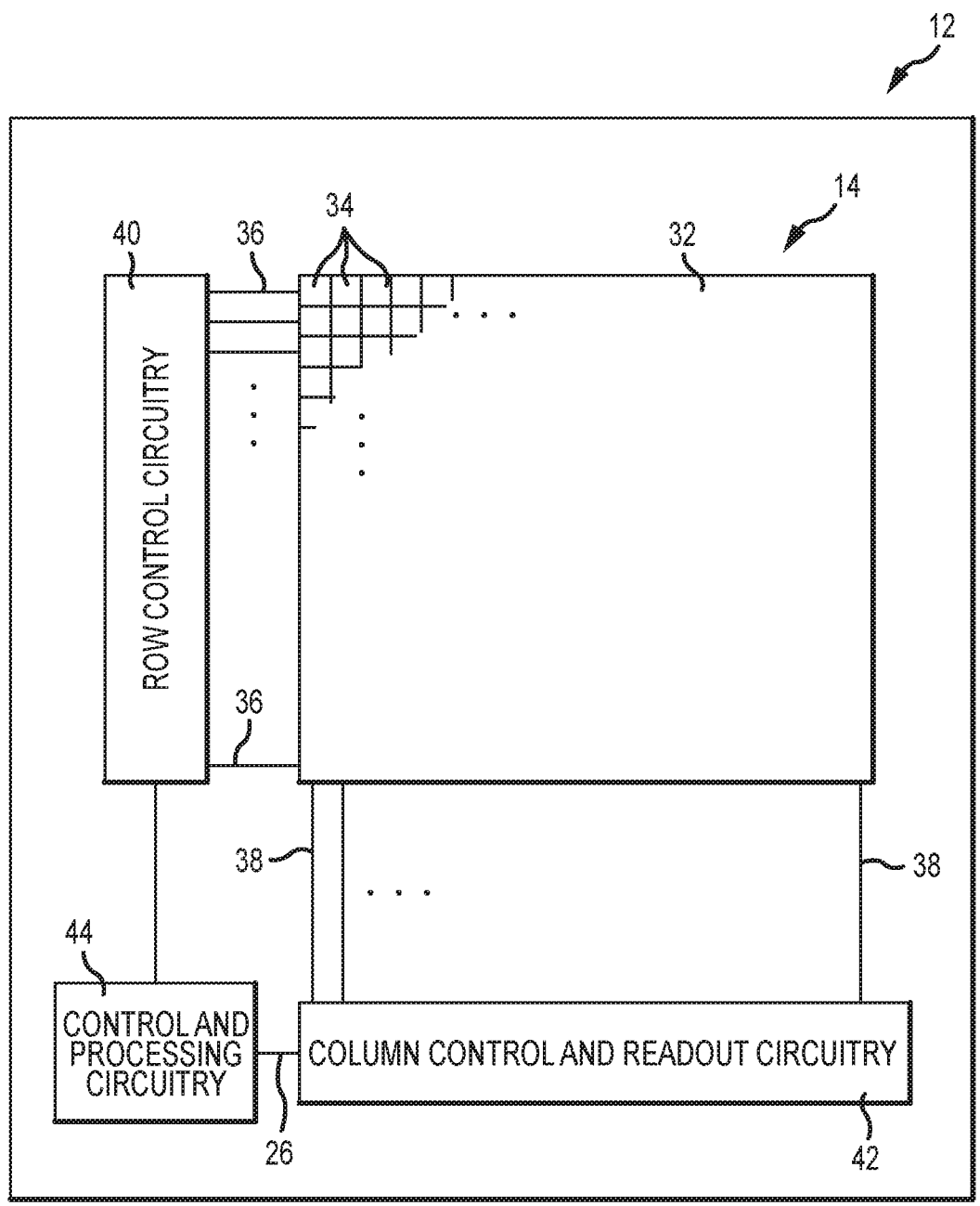
FIG. 2 is a diagram of illustrative imaging circuitry for generating image signals in an image sensor in accordance with some embodiments.

An example of an arrangement for camera module 12 of FIG. 1 is shown in FIG. 2. As shown in FIG. 2, camera module 12 includes image sensor 14 and control and processing circuitry 44. Control and processing circuitry 44 may correspond to image processing and data formatting circuitry 16 in FIG. 1. Image sensor 14 may include a pixel array such as array 32 of pixels 34 (sometimes referred to herein as image sensor pixels, imaging pixels, or image pixels 34) and may also include control circuitry 40 and 42. Control and processing circuitry 44 may be coupled to row control circuitry 40 and may be coupled to column control and readout circuitry 42 via data path 26. Row control circuitry 40 may receive row addresses from control and processing circuitry 44 and may supply corresponding row control signals to image pixels 34 over control paths 36 (e.g., dual conversion gain control signals, pixel reset control signals, charge transfer control signals, blooming control signals, row select control signals, or any other desired pixel control signals). Control paths 36 may also sometimes be referred to as row lines 36, control lines 36, row control signal lines, etc. Column control and readout circuitry 42 may be coupled to the columns of pixel array 32 via one or more conductive lines such as column lines 38. Column lines 38 may be coupled to each column of image pixels 34 in image pixel array 32 (e.g., each column of pixels may be coupled to a corresponding column line 38). Column lines 38 may be used for reading out image signals from image pixels 34 and for supplying bias signals (e.g., bias currents or bias voltages) to image pixels 34. During image pixel readout operations, a pixel row in image pixel array 32 may be selected using row control circuitry 40 and image data associated with image pixels 34 of that pixel row may be read out by column control and readout circuitry 42 on column lines 38.

Column control and readout circuitry 42 may include column circuitry such as column amplifiers for amplifying signals read out from array 32, sample and hold circuitry for sampling and storing signals read out from array 32, analog-to-digital converter circuits for converting read out analog signals to corresponding digital signals, and column memory for storing the read out signals and any other desired data. Column control and readout circuitry 42 may output digital pixel values to control and processing circuitry 44 over line 26.

Array 32 may have any number of rows and columns. In general, the size of array 32 and the number of rows and columns in array 32 will depend on the particular implementation of image sensor 14. While rows and columns are generally described herein as being horizontal and vertical, respectively, rows and columns may refer to any grid-like structure (e.g., features described herein as rows may be arranged vertically and features described herein as columns may be arranged horizontally).

Pixel array 32 may be provided with a color filter array having multiple color filter elements, which allows a single image sensor to sample light of different colors. As an example, image sensor pixels such as the image pixels in array 32 may be provided with a color filter array that allows a single image sensor to sample red, green, and blue (RGB) light using corresponding red, green, and blue image sensor pixels arranged in a Bayer mosaic pattern. The Bayer mosaic pattern consists of a repeating unit cell of two-by-two image pixels, with two green image pixels diagonally opposite one another and adjacent to a red image pixel diagonally opposite to a blue image pixel. In another suitable example, the green pixels in a Bayer pattern are replaced by broadband image pixels having broadband color filter elements (e.g., clear color filter elements, yellow color filter elements, etc.). These examples are merely illustrative and, in general, color filter elements of any desired color and in any desired pattern may be formed over any desired number of image pixels 34.

Figure 3:
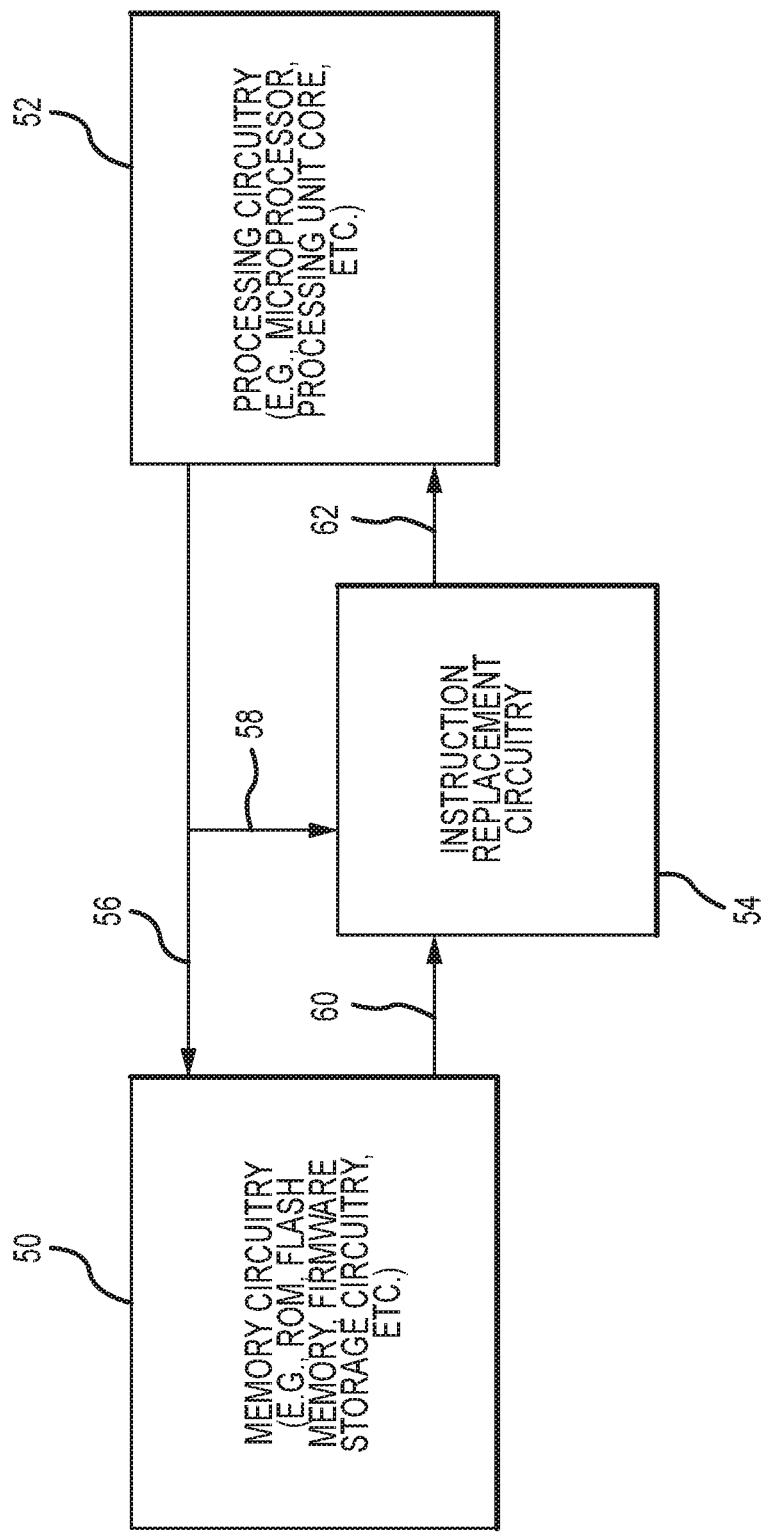
FIG. 3 is a diagram of illustrative data replacement circuitry interfaced between memory circuitry and processing circuitry in accordance with some embodiments.

FIG. 3 shows an illustrative hardware system having memory circuitry 50 and processing circuitry 52. As an example, memory circuitry 50 and processing circuitry 52 may be implemented as a portion of control and processing circuitry 44 in FIG. 2, image processing and data formatting circuitry 16 in FIG. 1, and/or storage and processing circuitry 24 in FIG. 1, or more broadly, as a portion of imaging system 10 or system 100 in FIG. 1.

Memory circuitry 50 may be implemented based on any suitable memory architecture or type. As examples, memory circuitry 50 may be a read-only memory (ROM), a flash memory, a flash ROM, a non-volatile memory, firmware storage circuitry, software instructions storage circuitry, etc. Processing circuitry 52 may be implemented based on any suitable processor architecture and may generally be a microprocessor, a central processing unit (e.g., a core in a central processing unit), any processing unit core, etc.

The example of memory circuitry 50 as a read-only memory that stores software (firmware) instructions and processing circuitry 52 as a processor core is described herein in connection with some illustrative embodiments. However, if desired, memory circuitry 50 and processing circuitry 52 may be implemented in any suitable manner.

As shown in FIG. 3, path 56 may be an address bus of a suitable width coupling memory circuitry 50 to processing circuitry 52. In particular, an address signal provided over path 56 may be indicative of an address in memory circuitry 50 to be accessed (e.g., from which data is read). In response to receiving the address signal, memory circuitry 50 may provide the data stored at the correspond address over path 60 (e.g., a data bus) to processing circuitry 52. In this way, processing circuitry 52 may receive instructions or data stored on memory circuitry 50 to perform suitable processing operations.

In some scenarios, it may be difficult to modify data stored in memory (or write data into memory) such as memory circuitry 50. As an example, memory circuitry 50 implemented as a read-only memory to store firmware instructions or other data. Firmware instructions can include errors that require correction. However, without the ability to modify data in or write data to the memory, faulty firmware may render the hardware system inoperable. As such, it may be desirable to provide an efficient and compact implementation to correct for faulty firmware instructions.

To facilitate the replacement of these faulty firmware instructions or other data in memory 50 or to provide extended capabilities to change/interrupt processing flow, instruction replacement circuitry 54 (sometimes referred to herein as data replacement circuitry) may be interposed between memory circuitry 50 and processing circuitry 52. In other words, data replacement circuitry 54 may serve as an interface for processing circuitry 52 in accessing processing circuitry 50 or vice versa.

In particular, the address signal provided over path 56 may also be provided to data replacement circuitry 54 over path 58. In other words, path 58 may similarly be an address bus coupling processing circuitry 52 to data replacement circuitry 54. Based on the address signal received over path 58, data replacement circuitry 54 may selectively replace the data retrieved from memory circuitry 50.

As an example, memory circuitry 50 may provide retrieved data (e.g., read data retrieved based on an associated address signal) to data replacement circuitry 54. Data replacement circuitry 54 may pass the retrieved data to processing circuitry 52 over path 62 based on the associated address signal received over path 58 (e.g., in response to data replacement circuitry 54 determining that the data is not faulty, does not require replacement, does not require patching, etc.). Data replacement circuitry 54 may also replace the retrieved data with replacement data (e.g., replacement instructions) and provide the replacement data to processing circuitry 52 over path 62 instead of the original retrieved data. Data replacement circuitry 54 may perform these replacement operations based on the associated address signal received over path 58 (e.g., in response to data replacement circuitry 54 determining that the data is faulty, requires replacement, requires patching, etc.). In other words, data replacement circuitry may monitor and alter processing circuitry access to memory circuitry.

As an example, data replacement circuitry 54 may provide a high-priority interrupt instruction to processing circuitry 52 instead of the retrieved data from memory circuitry 50. The high-priority interrupt function may provide processing circuitry 52 with the capabilities of performing any suitable number of operations in response to executing the interrupt instruction. As example, in response to the interrupt instruction, a counting operation can be performed, a measurement may be taken, measurement data may be gathered, other instructions may be prepared to be subsequently executed, etc.

Data replacement circuitry 54 may be implemented in the routing fabric between memory circuitry 50 and processing circuitry 52. In other words, data replacement circuitry 54 may be implemented separately from memory circuitry 50 and processing circuitry 52. As such, there may be no need to change the existing configuration of memory circuitry 50 and processing circuitry 52 when adding data replacement circuitry 54 to an existing system. This modular configuration provides data replacement functionalities to the system including memory circuitry 50 and processing circuitry 52 more efficiently and with greater ease.

Figure 4:
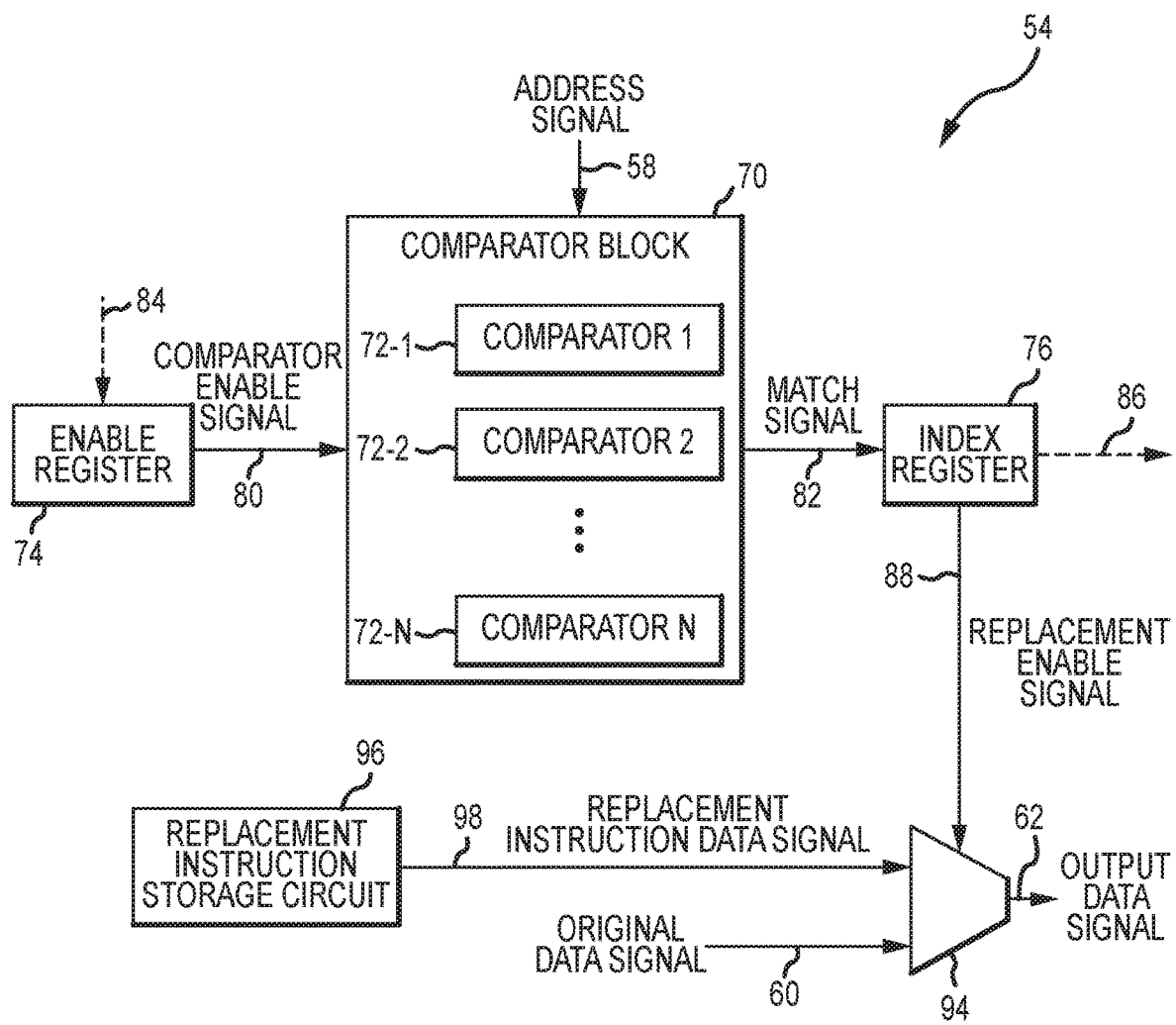
FIG. 4 is a diagram of illustrative data replacement circuitry that selectively provides replacement data to processing circuitry in accordance with some embodiments.

FIG. 4 shows an illustrative configuration for implementing data replacement circuitry 54 as shown in FIG. 3. In particular, data replacement circuitry 54 may include a comparator circuit block such as comparator block 70. Comparator block 70 may include any suitable number of comparators (e.g., comparators 72-1, 72-2, . . . , 72-N) as a bank of comparators coupled in parallel. Each comparator 72 (referring to each of comparators 72-1, 72-2, . . . , 72-N) may receive a unique address associated with an address in memory circuitry 50 in FIG. 3 at a first input, and as such, may be referred to as an address comparator. The unique address may be a function entry address noting the beginning of a set of instructions. One or more of comparators 72 (referring to comparators 72-1, 72-2, . . . , 72-N) may compare the corresponding unique address at their first inputs with the address (i.e., the address signal) received over path 58. Comparator block 72 may include dedicated storage circuits for storing each of the unique reference addresses. If desired, these unique reference addresses may be stored at other memory circuitry. Additionally, comparator block 72 may include some supporting logic circuitry shared by comparators 72.

As an example, the unique address associated with an address in memory circuitry 50 may correspond to an address, at which stored data requires correction, replacement, or patching (e.g. indicative of the beginning of a set of data that requires correction). The address signal may be received from processing circuitry 52 over path 58 in FIG. 3 and may be the same signal provided to memory circuitry 50 in FIG. 3. Based on the signal received over path 58, each comparator 72 may determine whether the received address matches with the reference address of that comparator (referred above also as the unique address of that comparator, sometimes hereinafter as a stored address of that comparator).

The comparison process of comparators 72 may be performed in parallel or sequentially (e.g., only after it is determined that the address signal does not match the reference address at a previous comparator, is the addressed signal checked with a subsequent comparator against the reference address at the subsequent comparator). If desired, different configurations of coupling path 58 to comparators 72 may be provided (e.g., path 58 may split into multiple parallel paths that are coupled to an input of each comparator 72, path 58 may be coupled to switching circuitry that selectively couples to an input of a selected one of the comparator 72, etc.).

Comparator block 72 may include, as an example, 32 comparators. This is merely illustrative. If desired, comparator block 72 may include 16 comparators, 64, comparators, any other number of comparators less than 32 comparators, or any other number of comparators more than 32 comparators.

Data replacement circuitry 54 may include a first register such as enable register 74. Enable register 74 may be coupled to comparator block 72 to selectively enable one or more of comparators 72. In particular, a comparator enable signal may be provided over path 80 (e.g., an enable bus) to comparator block 70 (e.g., to each of comparators 72, to a control input of each of comparators 72). Enable register 74 may have a width that corresponds to the number of comparators in comparator block 70. In the example of comparator block having 32 comparators, enable register 74 may be implemented as a 32-bit wide register, each bit corresponding to an enable path connected to a respective one of the 32 comparators. In this example of a single enable register, each output bit of the register may control a separate comparator and any combination of comparators may be enabled and/or disabled with a single write operation to the enable register.

In some scenarios when there are fewer addresses at which data needs replacement in memory than there are comparators 72, comparators 72 may not all be active or enabled. As such, enable register 74 may provide enable signals only to those comparators 72 that include a reference address (e.g., that receives a stored address). Additional comparators 72 may be subsequently activated/enabled as necessary (e.g., when there are additional reference addresses to be checked against). Existing active comparators 72 may also be deactivated as necessary (e.g., when data at the corresponding reference addresses requires no further replacement). A control signal received over path 84 (e.g., from processing circuitry 52) may indicate that state of comparator block 70 (e.g., how many and which comparators should be enabled).

Data replacement circuitry 54 may include a second register such as index register 76. In response to determining that the address signal provided over path 58 matches one of the reference addresses received at comparators 72, an (asserted) match signal may be provided over path 82 (e.g., a data bus) to index register 76. The match signal may include information indicative of a match and also indicative of the exact comparator at which the match occurred. As an example, index register 76 may provide the comparator identifier (indicating the comparator at which the match occurred in comparators 72) to other circuitry such as processing circuitry 52 in FIG. 3 over path 86. In particular, index register 76 may identify and store information associated with the comparator that most recently triggered a match. This is merely illustrative. If desired, the match signal may be a bit line that is only indicative of a match when asserted. Additional information regarding the comparator at which the match occurred may separately be provided to index register 76 or to other circuitry such as processing circuitry 52.

Data replacement circuitry 54 may include switching circuitry such as multiplexer 94 (sometimes referred to as switching circuitry 94). Multiplexer 94 may have a first data input (terminal), a second data input (terminal), and a control input (terminal). The first data input of multiplexer 94 may be coupled to replacement instruction storage circuit 96. Replacement instruction storage circuit 96 may provide a replacement data signal (e.g., a replacement instruction data signal) over path 98 (e.g., a data bus) to the first data input. The second data input of multiplexer 94 may be coupled to path 60 (e.g., a data bus). As an example, memory circuitry 50 in FIG. 3 may be coupled to the second data input via path 60 and provide a data signal indicative of retrieved data to the second input of multiplexer 94. The data signal provided over path 60 from memory circuitry 50 may correspond to the data accessed from memory circuitry 50 using the address indicated by the address signal over path 58 (and similarly path 56).

Multiplexer 94 may pass a selected one of the signals received at the first and second data inputs as its output data signal over path 62 (e.g., a data bus) based on the signal received at the control input. In particular, multiplexer 94 may receive a replacement enable signal over path 88 (e.g., a bit line) from index register 76. Based on the state of the replacement enable signal, multiplexer 94 may select one of the replacement data signal and the data signal from memory (memory circuitry 50 in FIG. 3) as the output signal of multiplexer 94. Path 62 may be coupled to processing circuitry 52 in FIG. 3 and provide the output data signal to processing circuitry 52.

Replacement data storage circuit 96 (sometimes referred to herein as replacement instruction storage circuit 96) may store a hard-coded set of instructions. This same set of instructions may be provided to multiplexer 94 regardless of the comparator 72 at which a match occurred. As an example, this set of instructions (sometimes referred to herein as replacement instructions) may be a supervisor call instruction. Replacement data storage circuit 96 may be implemented as a dedicated storage circuit of data replacement circuitry 54 or may be implemented as part of other memory circuitry such as memory circuitry 50, memory associated with processing circuitry 52 (e.g., random-access memory), etc.

Figure 5:
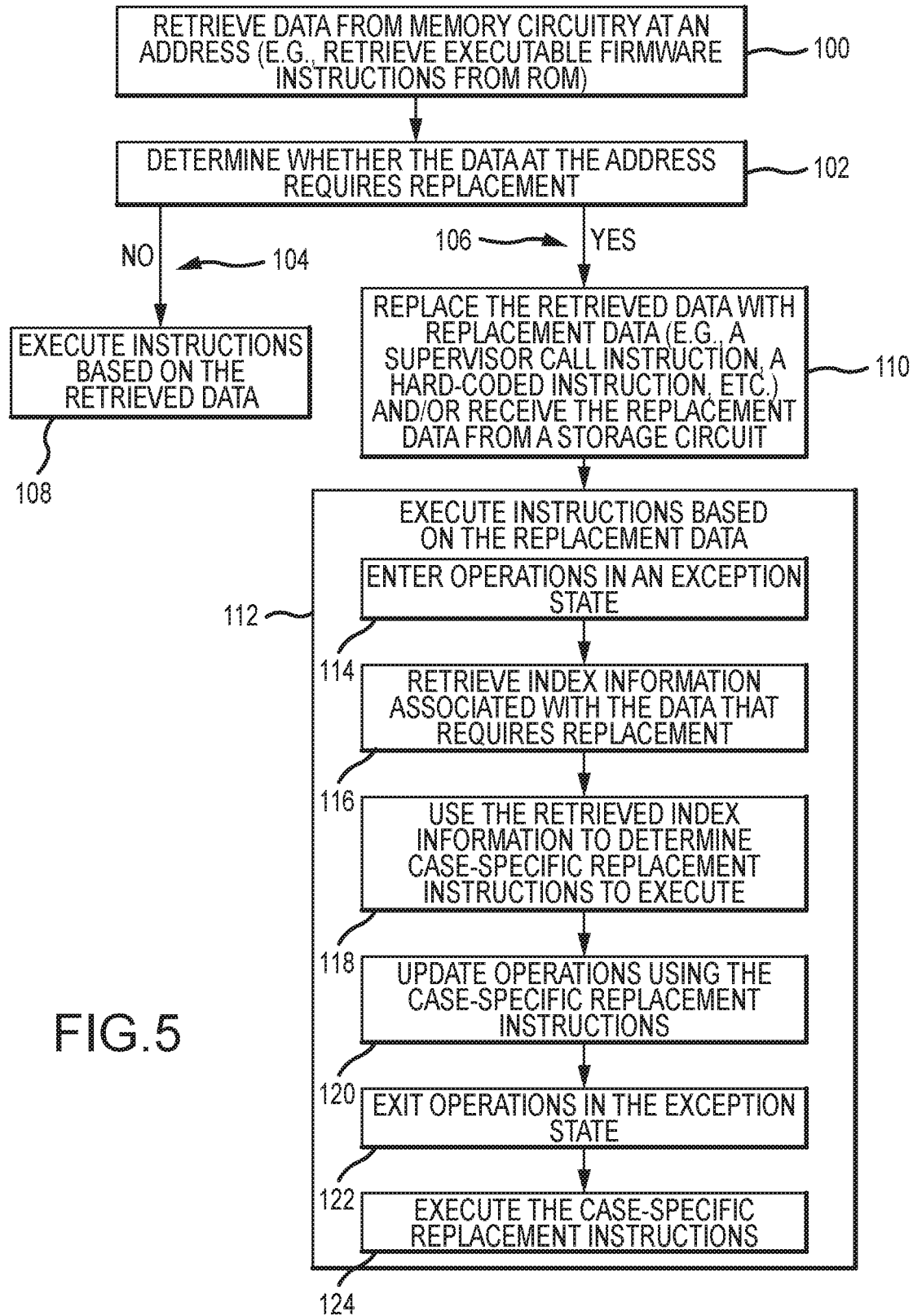
FIG. 5 is an illustrative flowchart for selectively providing replacement data to processing circuitry and performing processing based on the replacement data in accordance with some embodiments.

FIG. 5 shows an illustrative flowchart for replacing data from memory circuitry. As an example, a system including memory circuitry 50, processing circuitry 52, and/or data replacement circuitry 54 as described in connection with FIGS. 3 and/or 4 may process the flowchart in FIG. 5 to replace data from memory circuitry 50 using data replacement circuitry 54 when performing processing operations using processing circuitry 52. However, this is merely illustrative. If desired, any suitable system (e.g., any system having data replacement capabilities) may operate based on the flowchart of FIG. 5.

At step 100, processing circuitry such as processing circuitry 52 may retrieve data from memory circuitry such as memory circuitry 50 at a particular address. As an illustrative example, processing circuitry 52 may retrieve a set of firmware instructions from a read-only memory (e.g., memory circuitry 50 implemented as a ROM). The processing circuitry may retrieve data from the memory circuitry by providing an address to the memory circuitry at which the data is located in the memory circuitry (e.g., over path 56 in FIG. 3). The processing circuitry may subsequently expect the accessed data to be provided from memory circuitry (e.g., over paths 60 and 62 in FIG. 3).

At step 102, data replacement circuitry such as data replacement circuitry 54 described in connection with FIGS. 3 and/or 4 may determine whether the data (beginning) at the particular address requires replacement. As an example, comparator block 70 in FIG. 4 may use comparators 72 to determine whether the particular address matches any reference addresses associated with each of comparators 72.

In response to determining that the data does not require replacement, processing may proceed via path 104. At step 108, the processing circuitry may receive the retrieved data (e.g., the data that begins at or is stored at the particular address in memory circuitry) and may execute (firmware/software) instructions based on the retrieved data. In the example of the retrieved data itself being functions or firmware instructions, the processing circuitry may execute or process data itself (i.e., the firmware instructions).

In response to determining that the data does require replacement, processing may proceed via path 106. At step 110, the data replacement circuitry may replace the retrieved data with replacement data (e.g., with a set of replacement instructions, a supervisor call instruction, a hard-coded instruction, etc.). The processing circuitry may receive the replacement data from a storage circuit (e.g., storage circuit 96 in FIG. 5). As an example, data replacement circuitry 54 may selectively pass the supervisor call instruction stored at storage circuit 96 to processing circuitry 52. In other words, switching circuitry 94 may selectively pass the replacement instruction data signal instead of the original data signal received from memory circuitry 50 as the output signal. In particular, any address match at any comparator may cause the original data instructions to be replaced with the same replacement data (e.g., with the same supervisor call instruction).

At step 112, the processing circuitry may execute instructions based on the replacement data (e.g., the supervisor call instruction from storage circuit 96). In the example of replacement data being a supervisor call instruction, the processing circuitry may directly process the supervisor call instruction. Consequently, the processing circuitry may process steps 114-124. In other words, executing step 112 may involve the processing circuitry processing steps 114-124, as an example.

At step 114, the processing circuitry may enter operations in an exception state. In particular, executing of the supervisor call instruction may change the instruction (code) execution flow. As an example, executing the supervisor call instruction may cause the processing circuitry to engage an exception handler to handle the exception caused by the supervisor call instruction. This may pause or halt normal operations or normal processing flow of the processing circuitry. As such, the processing circuitry may enter operations in an exception state to resolve the exception. In the example of the execution of the supervisor call instruction, the processing circuitry may prioritize this exception over any other exceptions and pause all other operations.

At step 116, the processing circuitry may retrieve index information associated with the data that requires replacement. As an example, the processing circuitry may request and receive information from index register 76 via path 86 in FIG. 4. The information may include information indicating at which comparator a match occurred to enable replacement, the information indicating which address signal was received over path 58 in FIG. 4 to result in the match, information indicating which case-specific set of instructions should be executed instead of the instruction data retrieved from memory circuitry 50, etc. In particular, the processing circuitry may receive an index indicative of the comparator at which the match occurred (e.g., may receive a number n, indicative of the nth comparator in comparator block 70).

At step 118, the processing circuitry may use the retrieved index information to determine the case-specific replacement instructions to execute. As an example, the processing circuitry such as processing circuitry 52 may include and/or be associated with additional storage circuitry (e.g., random-access memory RAM, volatile memory, non-volatile memory). The additional storage circuitry (e.g., RAM) may store a table associating a given address in memory circuitry 50 or a given comparator 72 with a given set of replacement instructions. Each set of replacement instructions may be specific to the given address in memory circuitry 50 or the given comparator 72 that stores the given address as a reference address. As such, a corresponding case-specific set of replacement instructions may be used when the respective address is matched at a given comparator 72. While the example of a table is described herein, any other form of data storage may be provided.

At step 120, the processing circuitry may update operations using the case-specific replacement instructions. As an example, the processing circuitry may operate using an operating environment that keeps track of constants, variables, value, and other parameters. In this case, the operation environment may be updated to include the case-specific replacement instructions or to include a reference to the address in the additional storage circuitry at which the specific replacement instructions is stored or begins. If desired, other parameters may also be updated.

At step 122, the processing circuitry may exit operations in the exception state and return to normal operations. As an example, the exception may be resolved by updating the operating environment to include the reference to the address at which the case-specific replacement instructions are stored. This process may also remove and/or replace any reference made to the faulty instructions stored at the address in memory circuitry 50.

At step 124, the processing circuitry may execute the case-specific replacement instructions. These case-specific replacement instructions may be executed in lieu of the original instructions stored on memory circuitry 50. Additionally, these case-specific replacement instructions are different from the instruction stored at replacement data storage circuitry 96 in FIG. 4. The replacement instruction stored at storage circuit 96 may be a general supervisor call instruction that is passed to processing circuitry 52. In other words, regardless of the comparator 72, at which a match occurs, the same replacement instruction is passed through multiplexer 94 to processing circuitry 52. However, in the case of the case-specific replacement instructions stored in processing and storage circuitry 52, a match at a given comparator corresponds to a different set of case-specific replacement instructions. As examples, a match at comparator 72-1 may trigger case 1-specific replacement instructions to be used, a match at comparator 72-2 may trigger case 2-specific replacement instructions to be used, . . . , a match at comparator 72-N may trigger case N-specific replacement instructions to be used. While some of these case replacement instructions maybe the same, most of these case-specific replacement instructions may be different.

Figure 6:
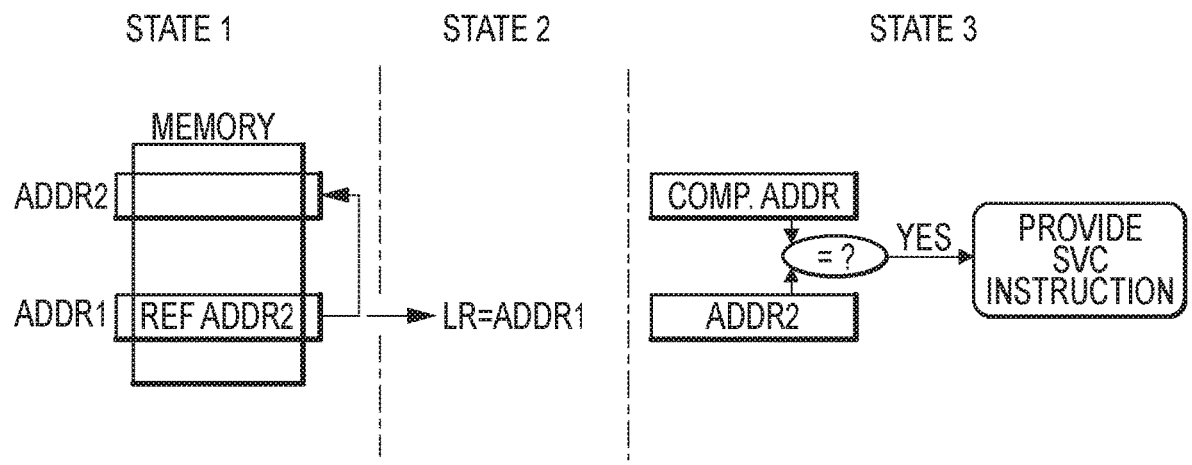
FIG. 6 is a diagram of illustrative states of an electronic system for providing replacement data to processing circuitry in accordance with some embodiments.

FIG. 6 shows illustrative states of a system having data replacement capabilities (e.g., having memory circuitry 50, processing circuitry 52, and data replacement circuitry 54).

In state 1 of FIG. 6, two address ADDR1 and ADDR2 are specifically shown in memory (e.g., memory circuitry 50). Addresses ADDR1 and ADDR2 may both store portions of firmware instructions or other data to be executed in processing circuitry 52. In particular, address ADDR1 may contain a reference (e.g., firmware instructions having a reference) to execute the instructions stored at address ADDR2.

In state 2 of FIG. 6, processing circuitry 52 may store one or more variables (e.g., LR, PC, etc.) to track the operational order of processing. In particular, the variable may be a link register value (a value stored at a link register in processing circuitry 52). The link register value may be set/updated to the value of address ADDR1 (i.e., LR=ADDR1). By doing so, processing circuitry 52 may return control to the calling instructions (e.g., the instructions at address ADDR1).

In some scenarios, processing circuitry 52 (e.g., based on input from a user, based on some other input) may flag the firmware instructions stored at address ADDR2 as being faulty, requiring correction, requiring replacement, etc. As such, processing circuitry 52 may provide a control signal to enable register 74 in FIG. 4 via path 84 to enable a comparator 72 and to provide an input of the enabled comparator 72 to store a reference address equal to address ADDR2 (e.g., to receive a reference address signal associated with address ADDR2 from storage circuit). This process may occur at any suitable time (e.g., any given time before the address at which data is faulty is accessed by processing circuitry 52).

In state 3 of FIG. 6, data replacement circuitry 54 may use the previously enabled comparator to perform a comparison operation between the comparator-stored reference address (i.e., COMP ADDR) and an address at which data is being accessed in memory circuitry 50. In this case, both inputs of the previously enabled comparator are the same (i.e., have values of address ADDR2). As such, an asserted signal may be provided to switching circuitry 94 at a control input to provide a hard-coded supervisor call instruction (i.e., a SVC instruction) to processing circuitry 52 from data replacement circuitry 54.

Figure 7:
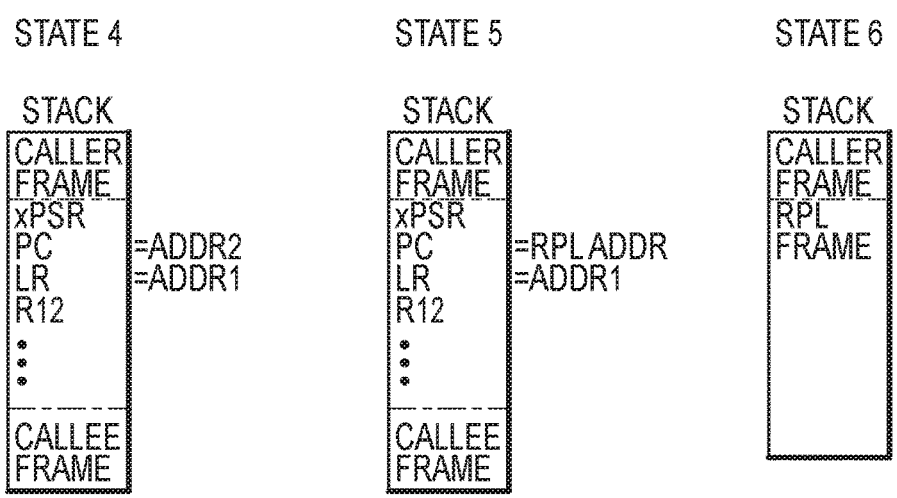
FIG. 7 is a diagram of illustrative states of an electronic system for performing processing based on replacement data in accordance with some embodiments.

FIG. 7 shows illustrative states of processing circuitry (e.g., processing circuitry 50) in performing exception handling in response to receiving and executing the supervisor call instruction. As an example, the illustrative operation environment of processing circuitry 52 may be referred to as a stack. The stack may partition operations of processing circuitry 52 into different frames (e.g., caller frames, current frame, callee frames, etc.) and store parameters (e.g., values, variables, constants, etc.) associated with each of these frames.

In state 4 of FIG. 7, the operating environment of processing circuitry 52 may include a variety of values stored at registers and other circuitry. Most notably, the operating environment may include a LR value (link register value) assigned a value equal to address ADDR1. This may be done in reference with the operations described in connection with state 2 in FIG. 6 as an example. Additionally, a PC value (program counter value) may be assigned a value equal to address ADDR2. However, because the data or instructions stored at address ADDR2 requires replacement, the PC value needs to be updated to an address that stores the replacement address to ensure proper operations of processing circuitry 52. Before, doing so, the SVC instruction may trigger an exception and processing circuitry 52 may operate in an exception state. The SVC-triggered exception may have higher-priority than all interrupts, and as such, this mechanism allows for patching of instructions requested by even interrupt handlers in performing processing.

In state 5 of FIG. 7, the PC value has been updated to a new address such as an address at which case-specific replacement instructions are stored (i.e., address RPL ADDR). The LR value remains the same because the reference to the original address ADDR2 still comes from address ADDR1 (as noted in state 1 of FIG. 6). At least by performing this update to the replacement data address, processing circuitry 52 may exit the exception state.

In state 6 of FIG. 7, the operating environment of processing circuitry 52 may have returned to operation in a normal state (e.g., exited operation in the exception state). The operating environment may store parameters for executing the case-specific replacement instructions in the RPL frame.

While in connection with some of the figures, patching sets of instructions in a read-only memory is described as an example, this example is merely illustrative. The embodiments herein are generally applicable to dynamic instruction/data replacement and may be implemented to count a number of times a function is called (e.g., retrieved from memory), measure execution time/speed, compute coverage metrics, execute monitoring functions in RAM, etc.

The foregoing is merely illustrative of the principles of this invention and various modifications can be made by those skilled in the art. The foregoing embodiments may be implemented individually or in any combination.

What is claimed is:

1. An imaging system comprising:
processing circuitry;
memory circuitry operable to receive an address in the memory circuitry and output data stored at the address; and
data replacement circuitry interposed between the processing circuitry and the memory circuitry, wherein the data replacement circuitry is operable to receive the output data and the address, wherein the data replacement circuitry comprises:
a set of comparators, each operable to perform a corresponding comparison operation using the address,
a replacement instruction storage circuit that stores a same hard-coded instruction for the set of comparators, wherein the data replacement circuitry is configured to output the same hard-coded instruction instead of the output data in response to a match resulting from any of the corresponding comparison operations at any comparator in the set of comparators, and
a register configured to provide an identifier of a comparator, with which the match is associated, to the processing circuitry.

2. The imaging system defined in claim 1, wherein the data replacement circuitry comprises:
switching circuitry coupled to the set of comparators.

3. The imaging system defined in claim 2, wherein the comparator is operable to perform the corresponding comparison operation using the address and a reference address.

4. The imaging system defined in claim 3, wherein the switching circuitry is operable to receive a replacement enable signal based on the corresponding comparison operations and to output the same hard-coded instruction instead of the output data based on the replacement enable signal.

5. The imaging system defined in claim 1, wherein the processing circuitry is operable to receive and execute the same hard-coded instruction in response to the match resulting from any of the corresponding comparison operations at any comparator in the set of comparators, and is operable to identify a set of replacement data each specific to a given comparator in the set of comparators from which the match resulted and specific to the address in the memory circuitry in response to the execution of the hard-coded instruction.

6. The imaging system defined in claim 5, wherein data replacement circuitry comprises switching circuitry coupled to the set of comparators and the switching circuitry is operable to replace the output data with the same hard-coded instruction for output when a replacement enable signal is asserted, regardless of which comparator in the set of comparators caused the replacement enable signal to be asserted.

7. The imaging system defined in claim 5, wherein the set of comparators includes one or more enabled comparators, and storage circuitry associated with the processing circuitry is operable to store one or more sets of replacement data corresponding respectively to the one or more enabled comparators.

8. The imaging system defined in claim 7, wherein the data replacement circuitry comprises:
an additional enable register operable to enable the one or more enabled comparators.

9. A method of patching data stored in memory circuitry, the method comprising:
receiving an address at which corresponding data is stored in the memory circuitry and with which processing circuitry is configured to access the corresponding data;
determining whether the address matches a set of reference addresses at which patching is required;
in response to determining that the address matches any reference address in the set of reference addresses, sending a same instruction to the processing circuitry that causes the processing circuitry to enter an exception state;
providing, to the processing circuitry, identifying information indicative of a given reference address that matched the address; and while the processing circuitry is in the exception state, identifying a case-specific replacement instruction specifically for patching the corresponding data at the address.

10. The method defined in claim 9, wherein determining whether the address matches the set of reference addresses comprises:
   with a first comparator, determining whether the address matches a first reference address; and
   with a second comparator, determining whether the address matches a second reference address.

11. The method defined in claim 10, wherein the same instruction is a supervisor call instruction, the method further comprising:
   with the processing circuitry, executing the supervisor call instruction to enter operations in the exception state.

12. The method defined in claim 11, wherein determining whether the address matches the set of reference addresses comprises determining that the address matches the second reference address, and wherein providing the identifying information indicative of the given reference address that matched the address comprises communicating information identifying the second comparator with the processing circuitry in response to determining that the address matches the second reference address.

13. The method defined in claim 12, wherein identifying the case-specific replacement instruction specifically for patching the corresponding data at the address comprises identifying the case-specific replacement instruction based on the information identifying the second comparator.

14. The method defined in claim 13, further comprising:
   updating a processing environment of the processing circuitry during the operations in the exception state to include a reference to the case-specific replacement instruction.

15. An electronic system comprising:
   processing circuitry;
   a read-only memory; and
   data replacement circuitry coupled between the processing circuitry and the read-only memory, the data replacement circuitry comprising:
      a comparator block that includes a plurality of comparators,
      a register coupled to the comparator block and configured to provide information identifying a given comparator in the plurality of comparators to the processing circuitry,
      switching circuitry having a control input coupled to the register and having a first data input coupled to the read-only memory and a second data input, and
      a replacement instruction storage circuit that is coupled to the second data input of the switching circuitry and that is configured to store a hard-coded instruction shared by the plurality of comparators, wherein the switching circuitry is configured to pass the hard-coded instruction to an output of the switching circuitry in response to a match at any enabled comparators in the comparator block.

16. The electronic system defined in claim 15, further comprising:
   an additional register operable to enable at least a portion of the comparators in the plurality of comparators associated with the one or more enabled comparators in the comparator block.

17. The electronic system defined in claim 16, wherein the enabled portion of the comparators each receives a unique reference address and each unique reference address is associated with an address in the read-only memory that requires patching.

18. The electronic system defined in claim 15, wherein the replacement instruction storage circuit is directly coupled to the second data input of the switching circuitry.

19. The electronic system defined in claim 15, wherein the register is operable to receive match information and to forward the match information to the processing circuitry.

20. The electronic system defined in claim 15, wherein the read-only memory is configured to store firmware instructions, the processing circuitry is configured to retrieve a given firmware instruction, and the data replacement circuitry is configured to patch the given firmware instruction by providing a supervisor call instruction as the hard-coded instruction to the processing circuitry instead of the firmware instruction.

* * * * *